United States Patent
Son

(10) Patent No.: US 12,104,683 B2
(45) Date of Patent: Oct. 1, 2024

(54) TORQUE CONVERTER

(71) Applicant: VALEO KAPEC CO., LTD., Daegu (KR)

(72) Inventor: Heesik Son, Daegu (KR)

(73) Assignee: VALEO KAPEC CO., LTD., Daegu (KR)

(*) Notice: Subject to any disclaimer, the term of this patent is extended or adjusted under 35 U.S.C. 154(b) by 0 days.

(21) Appl. No.: 18/253,804

(22) PCT Filed: Oct. 14, 2021

(86) PCT No.: PCT/KR2021/014277
§ 371 (c)(1),
(2) Date: May 22, 2023

(87) PCT Pub. No.: WO2022/131507
PCT Pub. Date: Jun. 23, 2022

(65) Prior Publication Data
US 2024/0003414 A1 Jan. 4, 2024

(30) Foreign Application Priority Data
Dec. 14, 2020 (KR) .................. 10-2020-0173977

(51) Int. Cl.
*F16H 45/02* (2006.01)
*F16F 15/123* (2006.01)

(52) U.S. Cl.
CPC .......... *F16H 45/02* (2013.01); *F16F 15/1234* (2013.01); *F16H 2045/0221* (2013.01); *F16H 2045/0278* (2013.01)

(58) Field of Classification Search
CPC ............... F16H 41/26; F16H 41/30; F16H 45/02–2045/0294; F16F 15/12313–1234; F16F 15/1343–13453
See application file for complete search history.

(56) References Cited

U.S. PATENT DOCUMENTS 2,149,887 A * 3/1939 Hickman ............... B60G 15/00
267/249
4,347,717 A * 9/1982 Lamarche ............... F16H 45/02
464/62.1
(Continued)

FOREIGN PATENT DOCUMENTS

JP 2-138261 U 11/1990
JP 10-318332 A 12/1998
(Continued)

OTHER PUBLICATIONS

International Search Report issued Jan. 20, 2022 in PCT/KR2021/014277 filed on Oct. 14, 2021, 3 pages.
(Continued)

*Primary Examiner* — Ernesto A Suarez
*Assistant Examiner* — James J Taylor, II
(74) *Attorney, Agent, or Firm* — Oblon, McClelland, Maier & Neustadt, L.L.P.

(57) ABSTRACT

Disclosed is a torque converter. A torque converter according to an embodiment of the present invention may include a front cover, an impeller assembly coupled to the front cover and configured to rotate together with the front cover, a turbine assembly disposed at a position facing the impeller assembly, a lock-up clutch including a piston configured to directly connect the front cover and the turbine assembly, and a torsional damper coupled to the lock-up clutch and configured to absorb impact and vibration applied in a rotation direction, in which a turbine shell provided in the turbine assembly may further include at least one damper connection part protruding in an axial direction toward the torsional damper and bent to be coupled to the torsional damper.

12 Claims, 7 Drawing Sheets

(56) References Cited

U.S. PATENT DOCUMENTS

| | | | | |
|---|---|---|---|---|
| 4,646,886 | A | * | 3/1987 | Nishimura .......... F16F 15/1234 |
| | | | | 192/205 |
| 4,959,039 | A | * | 9/1990 | Naudin ............. F16F 15/12333 |
| | | | | 192/205 |
| 6,106,400 | A | * | 8/2000 | Mizukami ............... F16H 45/02 |
| | | | | 464/68.92 |
| 6,273,227 | B1 | * | 8/2001 | Ohkubo ................. F16H 45/02 |
| | | | | 192/205 |
| 6,290,042 | B1 | * | 9/2001 | Breier ..................... F16H 45/02 |
| | | | | 192/205 |
| 9,360,058 | B2 | * | 6/2016 | Jameson ................. F16D 33/18 |
| 2014/0097055 | A1 | | 4/2014 | Lindemann et al. |

FOREIGN PATENT DOCUMENTS

| | | | |
|---|---|---|---|
| JP | 2006-64065 A | 3/2006 | |
| JP | 2008-38951 A | 2/2008 | |
| JP | 2014-219056 A | 11/2014 | |
| KR | 10-2020-0068224 | 6/2020 | |
| WO | WO-9945294 A1 * | 9/1999 | ............ F16H 45/02 |
| WO | WO-2006114236 A1 * | 11/2006 | ........... F16F 15/1234 |

OTHER PUBLICATIONS

Office Action dated Jul. 26, 2024, issued in Japanese Patent Application No. 2023-535951 (with machine English translation).

\* cited by examiner

TORQUE CONVERTER

TECHNICAL FIELD

The present invention relates to a torque converter, and more particularly, to a torque converter that adopts a turbine shell that serves as both a damper stopper and a driven plate, thereby reducing the number of components and ensuring an axial direction space.

BACKGROUND ART

In general, a torque converter is provided between an engine and a transmission of a vehicle to convert a rotational force received from the engine and transmit the converted force to the transmission.

The torque converter includes an impeller assembly configured to rotate by receiving driving power of the engine, a turbine assembly configured to be rotated by oil discharged from the impeller assembly, and a reactor (also called a 'stator') configured to increase a torque change rate by directing a flow of oil, which returns to the impeller assembly, in a rotation direction of the impeller assembly.

Because power transmission efficiency may deteriorate when a load applied to the engine increases, the torque converter is equipped with a lock-up clutch (also called 'damper clutch') that is a means for directly connecting the engine and the transmission. The lock-up clutch may be disposed between the turbine assembly and a front cover connected directly to the engine and serve to transmit rotational power of the engine directly to the turbine.

The lock-up clutch includes a piston configured to move in an axial direction and provided on an assembly coupled to the turbine assembly. Further, a friction member is coupled to the piston and in friction contact with the front cover.

In addition, a torsional damper is coupled to the piston and is capable of absorbing impact and vibration applied in a rotation direction of a shaft when the friction member is coupled to the front cover.

In the torque converter in the related art configured as described above, a driven plate is provided between the torsional damper and the turbine assembly and coupled to the turbine assembly. The driven plate is connected to the torsional damper and receives driving power. The driven plate may be provided between elastic members provided in the torsional damper and serve as a damper stopper.

However, because the torque converter adopts the driven plate, the torque converter in the related art essentially requires an axial direction space that needs to be ensured to dispose the driven plate. For this reason, there is a problem in that it is difficult to ensure a reserve of the axial direction space in the torque converter, and the number of components increases, which increases manufacturing costs and the number of manufacturing processes.

In addition, there is a problem in that it is difficult to ensure the axial direction space in the torque converter which causes constraint on a design layout and makes it difficult to design a compact torque converter.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to solve the above-mentioned problem, and an object of the present invention is to provide a torque converter that adopts a turbine shell that serves as both a damper stopper and a driven plate, thereby reducing the number of components and ensuring an axial direction space.

Technical Solution

To achieve the above-mentioned object, an exemplary embodiment of the present disclosure provides a torque converter including: a front cover; an impeller assembly coupled to the front cover and configured to rotate together with the front cover; a turbine assembly disposed at a position facing the impeller assembly; a lock-up clutch including a piston configured to directly connect the front cover and the turbine assembly; and a torsional damper coupled to the lock-up clutch and configured to absorb impact and vibration applied in a rotation direction, in which a turbine shell provided in the turbine assembly may further include at least one damper connection part protruding in an axial direction toward the torsional damper and bent to be coupled to the torsional damper.

Two opposite sides of the damper connection part may be respectively supported on two adjacent elastic members among a plurality of elastic members so that a reaction force is applied to the plurality of elastic members provided in the torsional damper.

A support clip may be mounted on the damper connection part.

The support clip may be disposed between the damper connection part and a spring seat mounted on an end of the elastic member, and two opposite sides of the support clip may be supported on the two adjacent elastic members.

The support clip may include: a main body having two opposite ends bent from a central portion so as to surround an outer periphery of the damper connection part protruding from the turbine shell, in which outer portions of the bent two opposite ends are supported on the elastic member; and catching protrusions formed at two opposite sides of the main body, which face each other, so as to be fixed to the two opposite sides of the damper connection part.

The damper connection part may have fitting grooves formed at positions corresponding to the catching protrusions so that the catching protrusions are fitted into the fitting grooves.

The catching protrusions may be inserted into the fitting grooves to prevent the support clip from separating from the damper connection part.

The support clip may be subjected to heat treatment so that durability and rigidity are reinforced, and the support clip may be made of a steel material having an elastic force.

The turbine shell may further include an opening hole defined by the damper connection part.

The opening hole may reduce a fluid pressure difference by allowing one side directed toward the impeller assembly and the other side directed toward the torsional damper to communicate with each other in the axial direction to reduce an axial load applied to the turbine shell by pressure of a fluid supplied thereinto.

The damper connection parts may be disposed on one surface of the turbine shell in a circumferential direction and provided at equal intervals within a preset angle range.

The torsional damper may include: a damper retaining plate coupled to the piston; and a plurality of elastic members mounted on the damper retaining plate and configured to apply an elastic force in a circumferential direction.

The torque converter may further include: a reactor positioned between the impeller assembly and the turbine assembly and configured to change a flow of a fluid, which is discharged from a turbine, toward an impeller.

Advantageous Effects

As described above, according to the torque converter for a vehicle according to the embodiment of the present invention, the turbine shell, which serves as both the damper stopper and the driven plate, is applied, which may ensure a reserve of the axial direction space in the torque converter.

In addition, according to the present invention, a total number of components may be reduced by removing the driven plate in the related art, which may reduce manufacturing costs and the number of manufacturing processes.

In addition, according to the present invention, the axial direction space is ensured in torque converter, which may improve a degree of freedom of a design layout, enable design of a compact torque converter, and make the torque converter lightweight.

MODE FOR INVENTION

Figure 1:
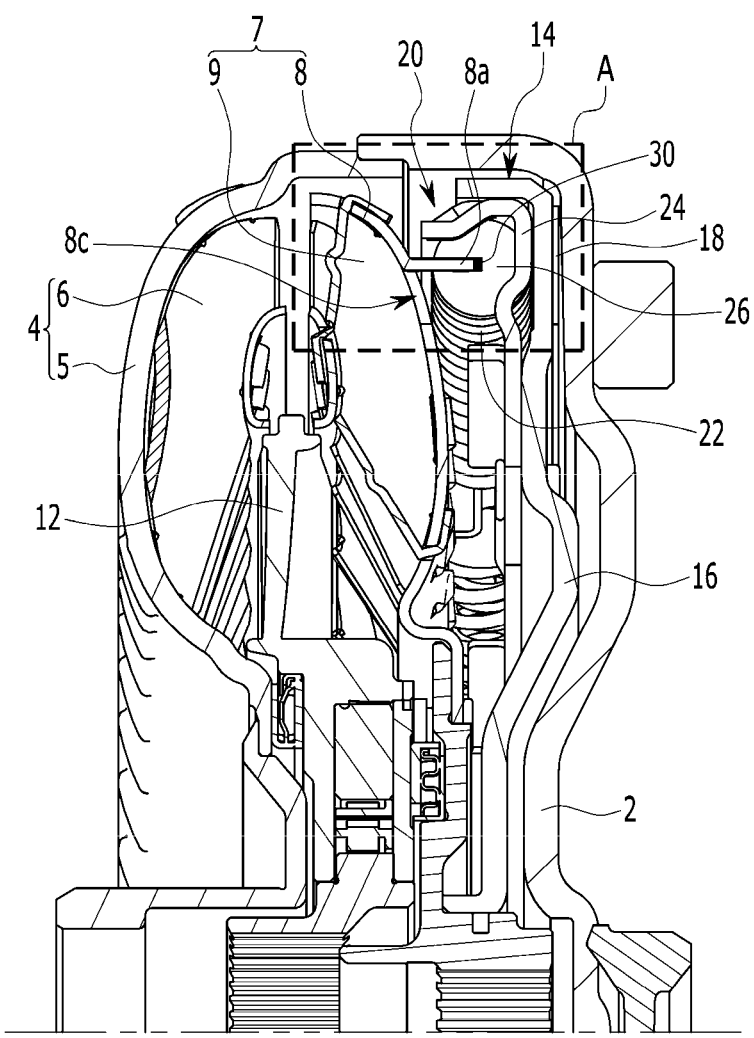
FIG. 1 is a half cross-sectional view of a torque converter according to an embodiment of the present invention.

Hereinafter, exemplary embodiments of the present invention will be described in detail with reference to the accompanying drawings.

The present invention is not limited to the embodiments disclosed herein, but will be variously changed and implemented in various different forms. The embodiments are provided so that the present invention will be thorough and complete, and also to provide a more complete understanding of the scope of the present invention to those of ordinary skill in the art.

Therefore, it should be understood that the present invention is not limited to the embodiments disclosed below, but the configuration of any one embodiment and the configuration of another embodiment can be substituted or added, and the present invention includes all alterations, equivalents, and alternatives that are included in the technical spirit and scope of the present invention.

In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

A part irrelevant to the description will be omitted to clearly describe the present invention, and the same or similar constituent elements will be designated by the same reference numerals throughout the specification.

The size and thickness of each component illustrated in the drawings are arbitrarily shown for ease of description, but the present invention is not necessarily limited thereto. In order to clearly describe several portions and regions, thicknesses thereof are enlarged.

In the drawings, sizes or thicknesses of constituent elements may be exaggerated, increased, or decreased for convenience of understanding, but the protection scope of the present invention should not be restrictively construed.

The terms used in the present specification are used only for the purpose of describing particular examples or embodiments and are not intended to limit the present invention. Further, singular expressions include plural expressions unless clearly described as different meanings in the context.

In the present application, the terms "comprises," "comprising," "includes," "including," "containing," "has," "having", and other variations thereof are inclusive and therefore specify the presence of features, integers, steps, operations, elements, components, and/or combinations thereof disclosed in the specification. That is, in the present application, the terms "comprises," "comprising," "includes," "including," "containing," "has," "having", and other variations thereof need to be understood as not precluding the presence or addition of one or more other features, integers, steps, operations, elements, components, and/or combinations thereof.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

When one constituent element is described as being "disposed above" or "disposed below" another constituent element, it should be understood that one constituent element can be disposed directly on another constituent element, and an intervening constituent element can also be present between the constituent elements.

Unless otherwise defined, all terms used herein, including technical or scientific terms, have the same meaning as commonly understood by those skilled in the art to which the present invention pertains.

The terms such as those defined in a commonly used dictionary should be interpreted as having meanings consistent with meanings in the context of related technologies and should not be interpreted as ideal or excessively formal meanings unless explicitly defined in the present application.

For the convenience, the directions in the specification are defined as follows.

A forward/rearward direction or an axial direction is defined as a direction parallel to a rotation axis. A front (forward) means any one direction of a power source, e.g., a direction toward an engine. A rear (rearward) means the other direction, e.g., a direction toward a transmission. Therefore, a front surface means a surface facing forward, and a rear surface means a surface facing backward.

A radial direction means a direction toward or away from a center of the rotation axis along a straight line passing through the center of the rotation axis on the plane perpendicular to the rotation axis. A direction radially away from the center is referred to as a centrifugal direction, and a direction toward the center is referred to as a centripetal direction.

A circumferential direction means a direction surrounding a circumference of the rotation axis. An outer periphery means an outer circumference, and an inner periphery means an inner circumference. Therefore, an outer peripheral surface is a surface facing away from the rotation axis, and an inner peripheral surface is a surface facing the rotation axis.

A circumferential surface means a surface, a normal line of which is directed in an approximately circumferential direction.

In addition, the term "unit", "means", "part", "member", or the like, which is described in the specification, means a unit of a comprehensive configuration that performs at least one function or operation.

Figure 2:
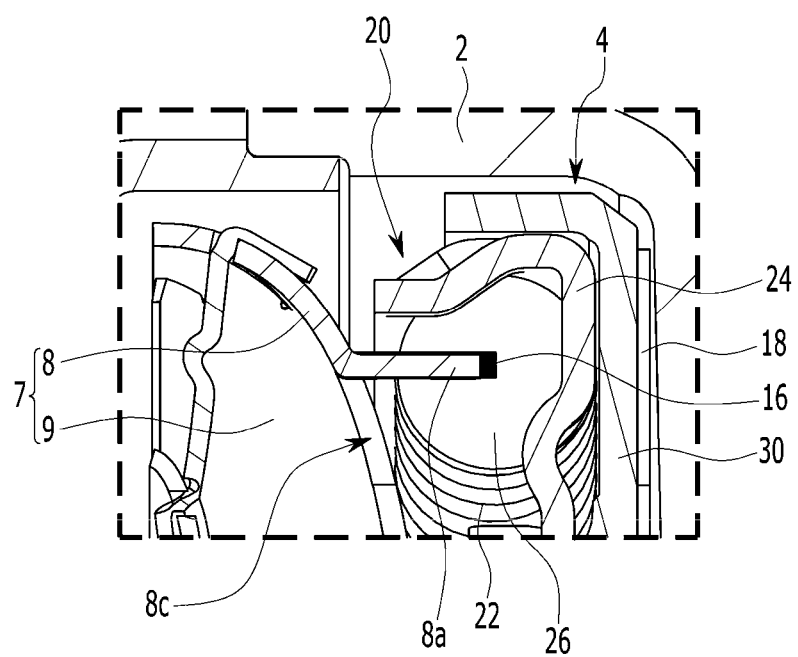
FIG. 2 is an enlarged view of part A in FIG. 1.
Figure 3:
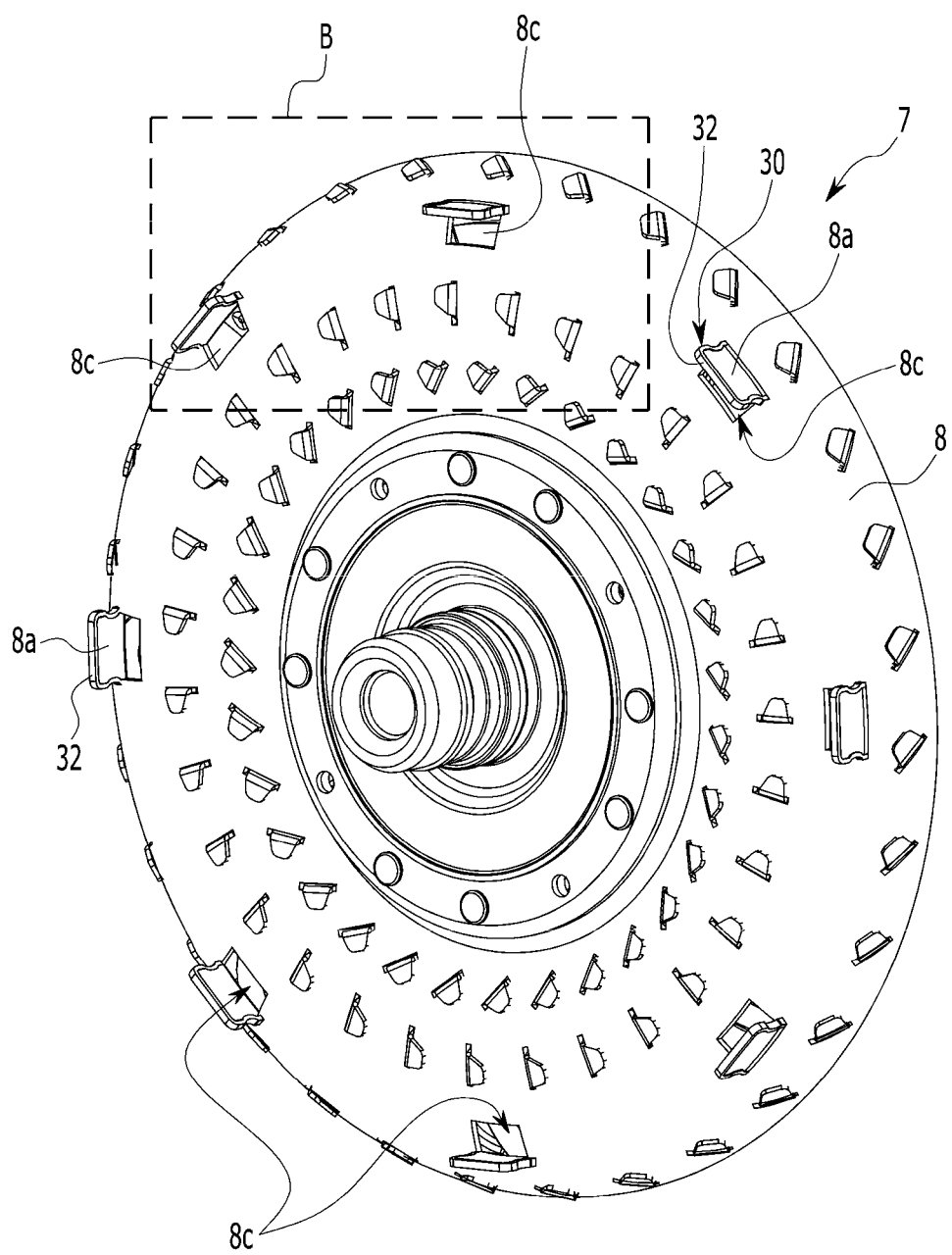
FIG. 3 is a cross-sectional view illustrating a state in which a turbine shell and a torsional damper of the torque converter according to the embodiment of the present invention are connected.
Figure 4:
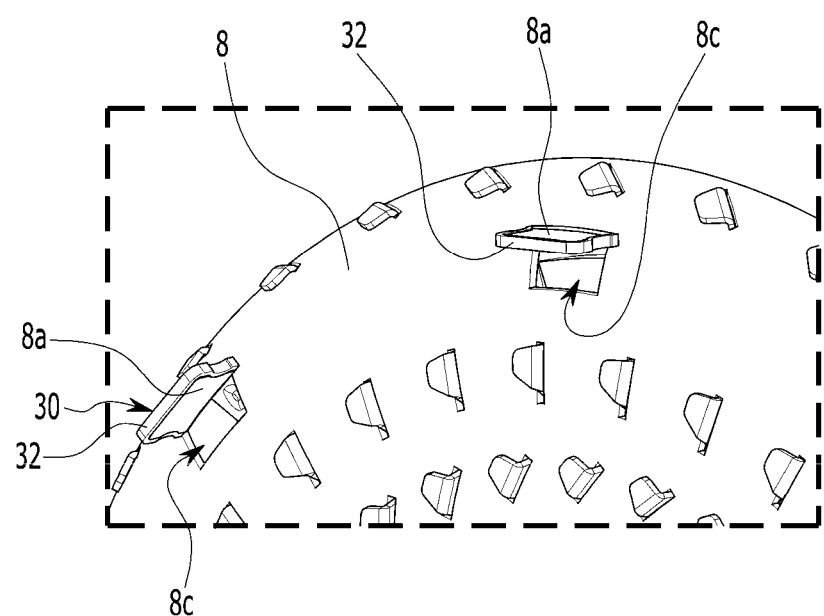
FIG. 4 is a perspective view of a turbine assembly applied to the torque converter according to the embodiment of the present invention.
Figure 5:
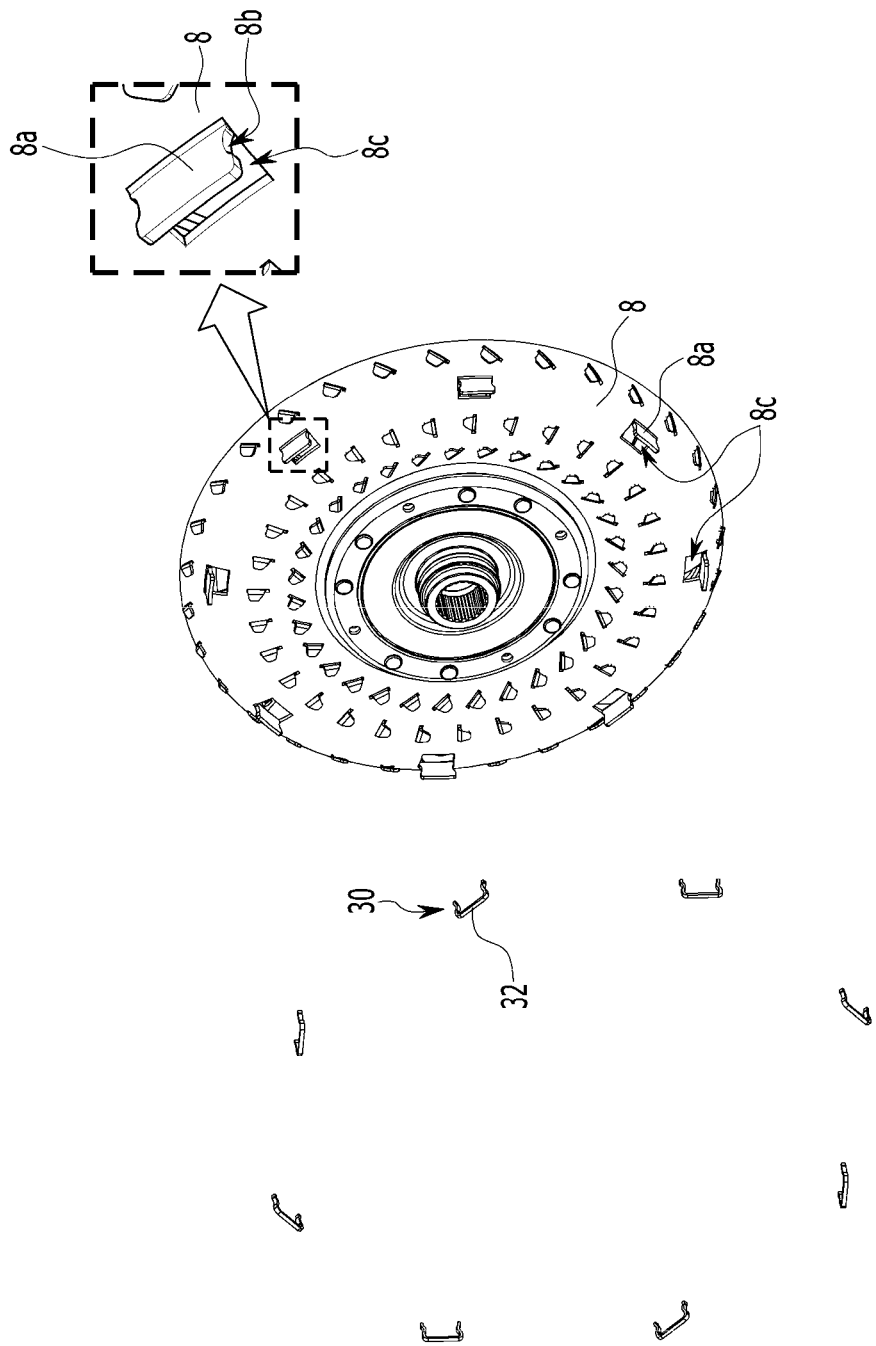
FIG. 5 is an enlarged view of part B in FIG. 4.
Figure 6:
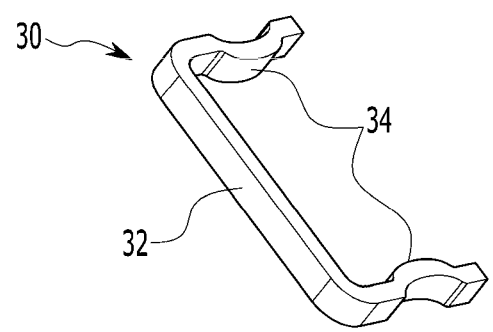
FIG. 6 is a perspective view illustrating a state in which the turbine shell and a support clip of the torque converter according to the embodiment of the present invention are disassembled.
Figure 7:
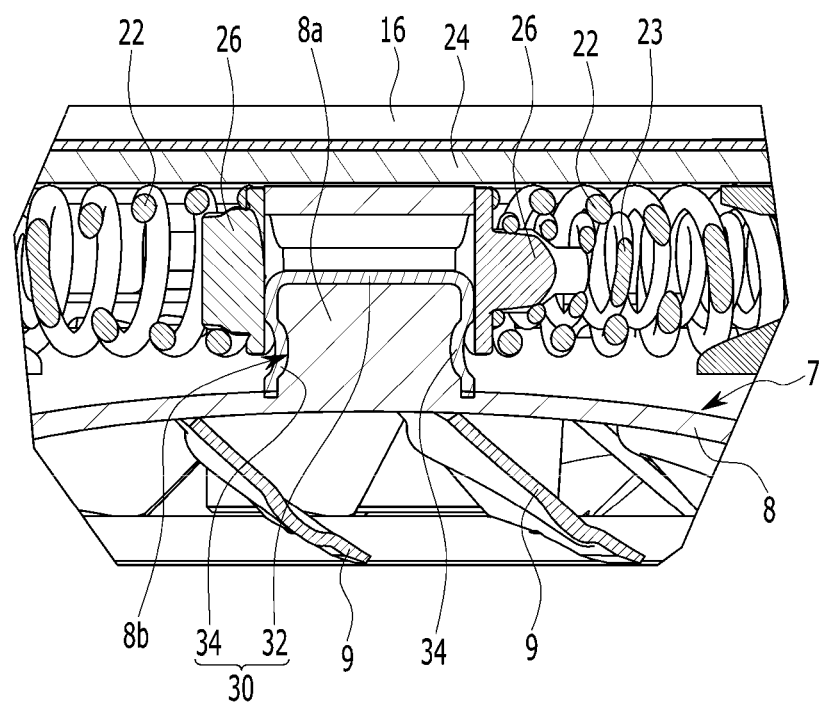
FIG. 7 is a perspective view of the support clip applied to the torque converter according to the embodiment of the present invention.

FIG. 1 is a half cross-sectional view of a torque converter according to an embodiment of the present invention, FIG. 2 is an enlarged view of part A in FIG. 1, FIG. 3 is a cross-sectional view illustrating a state in which a turbine shell and a torsional damper of the torque converter according to the embodiment of the present invention are connected, FIG. 4 is a perspective view of a turbine assembly applied to the torque converter according to the embodiment of the present invention, FIG. 5 is an enlarged view of part B in FIG. 4, FIG. 6 is a perspective view illustrating a state in which the turbine shell and a support clip of the torque converter according to the embodiment of the present invention are disassembled, and FIG. 7 is a perspective view of the support clip applied to the torque converter according to the embodiment of the present invention.

With reference to FIG. 1, a torque converter according to an embodiment of the present invention includes a front cover 2, an impeller assembly 4, a turbine assembly 7, a reactor 12, a lock-up clutch 14, a piston 16, and a torsional damper 20.

The front cover 2 is connected to an output shaft of an engine (not illustrated) and rotates by receiving driving power of the engine. The front cover 2 serves as a cover of one side of the torque converter to define a space in which a fluid flows in the torque converter.

The impeller assembly 4 serves as a cover of the other side of the torque converter to define the space in which the fluid flows in the torque converter. The impeller assembly 4 is connected to the front cover 2 and rotates together with the front cover 2.

The impeller assembly 4 may include an impeller shell 5 and a plurality of impeller blades 6.

Therefore, when the impeller assembly 4 rotates, a rotational force is transmitted to the fluid by the rotation of the impeller blade 6.

The turbine assembly 7 is provided between the impeller assembly 4 and the front cover 2 and disposed at a position facing the impeller assembly 4 so that the turbine assembly 7 rotates by receiving the rotational force by means of the fluid that receives the rotational force from the impeller assembly 4.

In addition, the fluid circulates between the impeller assembly 4 and the turbine assembly 7, such that the rotational force of the impeller assembly 4, which rotates integrally with the output shaft of the engine, is converted, and the converted force is transmitted to the turbine assembly 7.

Further, the reactor 12 is disposed between the impeller assembly 4 and the turbine assembly 7. The reactor 12 changes a flow of the fluid discharged from the turbine assembly 7 and transmits the fluid to the impeller assembly 4.

The reactor 12 has the same rotation center as the front cover 2. Further, the lock-up clutch 14 is used as a means that directly connects the engine and the transmission. The lock-up clutch 14 is disposed between the front cover 2 and the turbine assembly 7.

The lock-up clutch 14 includes the piston 16 having an approximately circular plate shape and configured to move in the axial direction. The piston 16 may rotate about a shaft and be disposed to be moved in parallel with the shaft.

In addition, a friction member 18 in friction contact with the front cover 2 is coupled to the piston 16.

In the illustrated embodiment of the present invention, the lock-up clutch 14 has a structure in which the piston 16 is in direct contact with the front cover 2 by means of the friction member. However, the present invention is not limited thereto. Various types of publicly-known lock-up clutches may be applied.

Further, the torsional damper 20 is coupled to the lock-up clutch 14. The torsional damper 20 serves to transmit the driving power, which is transmitted through the lock-up clutch 14, to the turbine assembly 7, absorb a torsional force applied in a rotation direction of the shaft, and attenuate vibration.

The torsional damper 20 includes first elastic members 22 configured to absorb impact and vibration applied in a circumferential direction.

As illustrated in FIGS. 2 and 3, the first elastic members 21 may be disposed in the circumferential direction (rotation direction) and provided on a damper retaining plate 24 coupled to the piston 16. The first elastic member 21 may be configured as a compression coil spring.

Therefore, the first elastic members 22 are supported by the damper retaining plate 24.

Meanwhile, the first elastic members 22 may be provided in the turbine assembly 7 and elastically supported by damper connection parts 8a to be described below. In this case, the damper connection part 8a may apply a reaction force against the first elastic members 22.

That is, the first elastic members 22 may be elastically supported between the damper retaining plate 24 and the damper connection parts 8a and absorb vibration and impact applied in the rotation direction (circumferential direction).

In this case, second elastic members 23 may be disposed in the first elastic member 22.

That is, as illustrated in FIG. 4, the second elastic members 23 may be mounted in the circumferential direction of the damper retaining plate 24 and disposed in the first elastic members 22.

Like the first elastic member 22, the second elastic member 23 is configured as a coil spring. The first and second elastic members 22 and 23 may have different elastic moduli.

Further, spring seats 26 may be respectively mounted at two opposite ends of the first and second elastic members 22 and 23 and support the two opposite ends of the first and second elastic members 22 and 23 on the damper connection part 8a and the damper retaining plate 24.

Meanwhile, in the present embodiment, as illustrated in FIGS. 2 to 6, the turbine assembly 7 includes a turbine shell 8, and a plurality of turbine blades 9 coupled to the turbine shell 8.

In this case, the turbine shell 8 may further include at least one damper connection part 8a protruding in the axial direction toward the torsional damper 20 and bent to be coupled to the torsional damper 20.

In a state in which three surfaces of the damper connection part 8a are cut at a side of an outer peripheral surface of the turbine shell 8, and the remaining one surface of the damper connection part 8a is integrally connected to the turbine shell 8, the damper connection part 8a is bent in the axial direction and the vertical direction and directed in the direction opposite to the turbine blade 9.

In this case, two opposite sides of the damper connection part 8a may be respectively supported on the two adjacent first elastic members 22 among the plurality of first elastic members 22 so that a reaction force is applied to the plurality of first and second elastic members 22 and 23 provided in the torsional damper 20.

The damper connection parts 8a may serve to couple the turbine assembly 7 to the torsional damper 20 and serve as a driven plate that has been applied to a torque converter in the related art.

That is, the turbine assembly 7 is coupled to the torsional damper 20 by means of the damper connection parts 8a, such that the driven plate, which has been applied in the related art, may be excluded, which may ensure an axial direction space in the torque converter.

Meanwhile, the damper connection parts 8a may be disposed on one surface of the turbine shell 8, which is directed toward the torsional damper 20, and provided at equal intervals in the circumferential direction within a preset angle range.

In this case, eight damper connection parts 8a may be provided at equal intervals while corresponding to the positions of the first elastic members 22 and being spaced apart from one another at an angle of 45° in the circumferential direction of the turbine shell 8.

As illustrated in FIGS. 6 and 7, a support clip 30 is mounted on the damper connection part 8a formed as described above.

The support clip 30 may be provided between the damper connection part 8a and the spring seat 26 mounted on the ends of the first elastic members 22 and 23, and two opposite sides of the support clip 30 may be supported on the two adjacent first elastic members 22.

In this case, the support clip 30 may include a main body 32 and catching protrusions 34.

First, two opposite ends of the main body 32 are bent from a central portion of the main body 32 so that the main body 32 surrounds an outer periphery of the damper connection part 8a protruding from the turbine shell 8a. Outer portions of the bent two opposite ends of the main body 32 may be supported on the spring seat 26 mounted on the first elastic member 22 (see FIG. 3).

Further, the catching protrusions 34 may be formed at two opposite sides of the main body 32, which face each other, so as to be fixed to the two opposite sides of the damper connection part 8a.

In this case, the damper connection part 8a may have fitting grooves 8b formed at positions corresponding to the catching protrusions 34 so that the catching protrusions 34 are fitted into the fitting grooves 8b.

Therefore, the catching protrusions 34 may be inserted into the fitting grooves 8b to prevent the support clip 30 mounted on the damper connection part 8a from separating from the damper connection part 8a.

The support clip 30 is subjected to heat treatment so that the durability and rigidity are reinforced. The support clip 30 is made of a steel material having an elastic force.

The support clip 30, which has been subjected to the heat treatment, has the improved durability implemented by ensuring hardness and strength. Therefore, it is possible to minimize a degree to which the support clip 30 is abraded by a pressing force applied from the first and second elastic members 22 and 23 when the torque converter operates.

That is, in the state in which the support clip 30 surrounds the outer periphery of the damper connection part 8a protruding from the turbine shell 8, the catching protrusions 34 are inserted into the fitting grooves 8b, such that the support clip 30 may be more stably mounted on the damper connection part 8a.

Meanwhile, in the present embodiment, as illustrated in FIGS. 2, 5, and 6, the turbine shell 8 may further include an opening hole 8c defined by the damper connection part 8a.

The opening hole 8c is a hole formed when the damper connection part 8a is formed on the turbine shell 8. The opening holes 8c may be equal in number to the damper connection parts 8a and formed at equal intervals in the circumferential direction of the turbine shell 8.

The opening hole 8c may reduce a fluid pressure difference by allowing one side directed toward the impeller assembly 4 and the other side directed toward the torsional damper 20 to communicate with each other in the axial direction to reduce an axial load applied to the turbine shell 8 by pressure of the fluid supplied into the torque converter.

That is, the opening hole 8c may reduce a difference between fluid pressure between the impeller assembly 4 and the turbine assembly 7 and fluid pressure between the turbine shell 8 and the torsional damper 20 in the torque converter, thereby reducing an axial load applied to the turbine shell 8.

Therefore, the torque converter according to the embodiment of the present invention is applied so that the damper connection part 8a formed integrally with the turbine shell 8 serves as the damper stopper and the driven plate. Therefore, it is possible to ensure a reserve of an axial direction space in the torque converter by eliminating the driven plate in the related art.

In addition, according to the present invention, a total number of components may be reduced by removing the driven plate in the related art, which may reduce manufacturing costs and the number of manufacturing processes.

In addition, according to the present invention, the axial direction space is ensured in torque converter, which may improve a degree of freedom of a design layout, enable design of a compact torque converter, and make the torque converter lightweight.

Further, according to the present invention, the opening holes 8c, which are formed in the turbine shell 8 by the damper connection parts 8a, may reduce a difference in hydraulic pressure between two opposite sides in the torque converter in the axial direction based on the turbine assembly 7, thereby reducing an axial load applied to the turbine shell 8 and improving durability of the turbine assembly 7.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

Further, even though the operational effects of the configurations of the present invention have not been explicitly disclosed and described in the description of the embodiment of the present invention, the effects, which can be expected by the corresponding configurations, should, of course, be acceptable.

The invention claimed is:

1. A torque converter comprising:
a front cover;
an impeller assembly coupled to the front cover and configured to rotate together with the front cover;
a turbine assembly disposed at a position facing the impeller assembly, the turbine assembly including a turbine shell;
a lock-up clutch including a piston configured to directly connect the front cover and the turbine assembly;
a torsional damper coupled to the lock-up clutch and configured to absorb impact and vibration applied in a rotation direction;
at least one damper connection part protruding in an axial direction of the turbine shell toward the torsional damper and bent to be coupled to the torsional damper,
wherein a support clip is mounted on the damper connection part, the support clip including
a main body having two opposite ends bent from a central portion so as to surround an outer periphery of the damper connection part protruding from the turbine shell; and
catching protrusions formed at two opposite sides of the main body, which face each other, so as to be fixed to two opposite sides of the damper connection part.

2. The torque converter of claim 1, wherein the two opposite sides of the damper connection part are respectively supported on two adjacent elastic members among a plurality of elastic members so that a reaction force is applied to the plurality of elastic members provided in the torsional damper.

3. The torque converter of claim 2, wherein the support clip is disposed between the damper connection part and a spring seat mounted on an end of one of the elastic members, and the two opposite sides of the main body of the support clip are supported on the two adjacent elastic members.

4. The torque converter of claim 2, wherein outer portions of the two opposite ends are supported on the two adjacent elastic members.

5. The torque converter of claim 4, wherein the damper connection part has fitting grooves formed at positions corresponding to the catching protrusions so that the catching protrusions are fitted into the fitting grooves.

6. The torque converter of claim 5, wherein the catching protrusions are inserted into the fitting grooves to prevent the support clip from separating from the damper connection part.

7. The torque converter of claim 1, wherein the support clip is subjected to heat treatment so that durability and rigidity are reinforced, and the support clip is made of a steel material having an elastic force.

8. The torque converter of claim 1, wherein the turbine shell further comprises an opening hole defined by the damper connection part.

9. The torque converter of claim 8, wherein the opening hole reduces a fluid pressure difference by allowing one side directed toward the impeller assembly and the other side directed toward the torsional damper to communicate with each other in the axial direction to reduce an axial load applied to the turbine shell by pressure of a fluid supplied thereinto.

10. The torque converter of claim 1, wherein the damper connection part is among a plurality of damper connection parts disposed on one surface of the turbine shell in a circumferential direction and provided at equal intervals within a preset angle range.

11. The torque converter of claim 1, wherein the torsional damper comprises:
a damper retaining plate coupled to the piston; and
a plurality of elastic members mounted on the damper retaining plate and configured to apply an elastic force in a circumferential direction.

12. The torque converter of claim 1, further comprising:
a reactor positioned between the impeller assembly and the turbine assembly and configured to change a flow of a fluid, which is discharged from the turbine assembly, toward the impeller assembly.

* * * * *